July 16, 1929. W. RINAU 1,721,471
FEED GEAR FOR DISINTEGRATORS, AGITATORS, MIXERS, AND KNEADERS
Filed Nov. 17, 1926
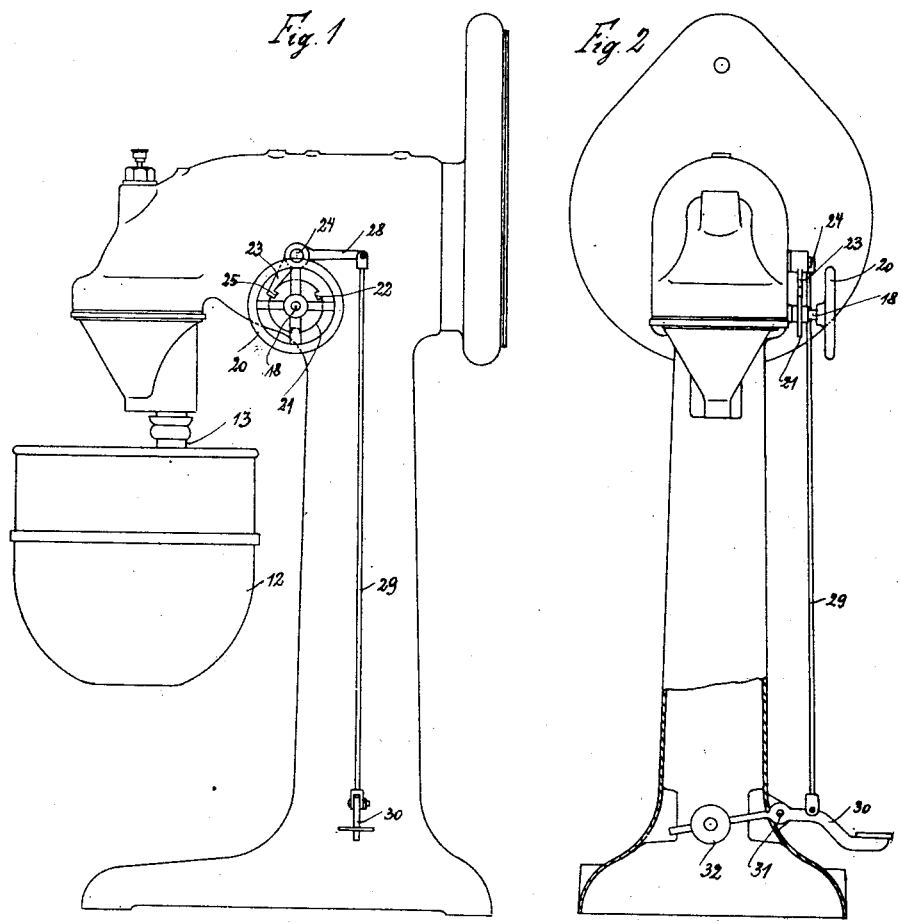

Patented July 16, 1929.

1,721,471

UNITED STATES PATENT OFFICE.

WILHELM RINAU, OF BREMEN, GERMANY.

FEED GEAR FOR DISINTEGRATORS, AGITATORS, MIXERS, AND KNEADERS.

Application filed November 17, 1926. Serial No. 148,980.

In disintegrators, agitators, mixers and kneaders the working element, i. e. the beater, agitator or kneader must be arranged so that it can be driven at different speeds.

The friction wheel gears which have been used hitherto for this purpose are not suitable at great stress. The toothed gears which have, therefore, been used must be uncoupled at the reversing, owing to the high number of revolutions, as it is impossible to reverse or to change the speed when the machine is running. The driving gear wheels are therefor uncoupled in such toothed gearings and the gearing is adjusted to idle running. In mechanisms of this type the danger exists that the changing over or reversing takes place without disengaging of the coupling.

This danger is avoided by the invention.

The invention consists in blocking the transmission gear by a catch device with which the coupling is connected, so that the changing to another speed is possible only after the catch device has been released, the driving shaft being uncoupled at the same time.

Other features of the invention are the special constructions of the catch device and of the releasing device.

The invention may be carried out in various manners. One embodiment of the invention is shown, by way of example, in the accompanying drawing in which:—

Fig. 1 shows a side elevation of the machine.

Fig. 2 shows in front elevation, partly in section, the machine the kneading vat being removed.

Fig. 3 shows the gearing in longitudinal section on larger scale.

On the shaft 2, which is permanently driven by convenient driving means, the clutch element 3 is keyed and a sleeve 4 loosely mounted on shaft 2 and the gears 5, 6, 7 are keyed to sleeve 4. On the sleeve 4 the movable clutch element 8 is splined. The clutch may be a multiple disk clutch and it is operated by a spring 9.

The clutch is shown in Fig. 3 in the coupling position so that by the gear wheel transmission 6, 10 a shaft 11 is rotated at low speed. The shaft 11 operates by transmission wheels a beater 13, kneader or the like working in the vat 12.

The driving mechanism and the beater or kneader may be of any convenient construction which has nothing to do with the invention.

On shaft 11 a sleeve 15 having teeth is shiftably mounted by means of a key 14 and groove. On the sleeve 15 three gear wheels 17, 10 and 16 are keyed which, according to the desired speed, are to be brought into gear with the gear wheels 5, 6 and 7.

The sleeve 15 is shifted by means of a pinion 19 keyed on a shaft 18 and meshing with the teeth of sleeve 15. On the outer end of shaft 18 a hand wheel 20 is fixed on the disk 21 of which several, for instance three, notches 22 are arranged corresponding to the three speeds. A nose 25 of a pawl 23, pivotably mounted on a shaft 24, is designed to engage with one of said notches 22. On the shaft 24 a clutch lever 26 is fixed which bears onto the flange 27 of the movable clutch element 8.

To a releasing lever 28 a downwardly directed rod 29 is hinged, the lower end of which is hingedly connected to a pedal lever 30. This pedal lever 30 has two arms and is pivotably mounted on a pivot bolt 31. A counter weight 32 on the pedal lever 30 serves to push rod 29 in upward direction.

The operation of the mechanism is as follows:—

If another transmission has to be thrown in the pedal lever 30 is depressed and the releasing lever 28 is moved inward so that the lever 26 on shaft 24 is oscillated and pulls back the movable clutch 8 as it bears on the flange 27 of this clutch element 8.

The clutch is uncoupled and the sleeve 4 carrying the wheels 5, 6, 7 is stopped. At the same time the lever 23 is oscillated and the hand wheel 20 and consequently the axle 18 are released. The toothed sleeve 15 can now be shifted through the hand wheel 20 so that another transmission is thrown in.

The adjusting to another speed is, therefore, possible only after the catch mechanisms consisting of the pawl 23, 25 have been released, the clutch element 8 being uncoupled at the same time.

The releasing lever 28 may be connected to the pawl 23 or these two elements may consist of one elbow lever.

I claim:—

A feed gear for disintegrators, agitators, mixers and kneaders, comprising in combination with the driving shaft a stationary clutch element and a shiftable clutch element and toothed wheels all on said driving shaft, a driven shaft, transmission wheels shiftable on said driven shaft for operating the agitator or similar element, a transverse axle under said driven shaft, a hand wheel on said transverse axle, a spur wheel on said hand wheel axle, and a mechanism for shifting said transmission wheels by said hand wheel axle, a mechanism for locking said shiftable transmission wheel comprising a disk rigid with said hand wheel and having notches, an intermediate transverse axle between said driving shaft and said driven shaft, a pawl on said intermediate transverse axle adapted to engage with one of the notches of said disk, a clutch lever on said intermediate axle adapted to operate said shiftable clutch element, and a pedal lever mechanism for rotating said intermediate transverse axle so that by rotation of said intermediate axle said transmission wheels are unlocked by the disengaged pawl only when said shiftable clutch element has been disengaged by said clutch lever.

In testimony whereof I affix my signature.

WILHELM RINAU.